US012622365B2

(12) United States Patent
Luo et al.

(10) Patent No.: US 12,622,365 B2
(45) Date of Patent: May 12, 2026

(54) VENTILATOR FOR PLANT CULTIVATION

(71) Applicant: Shanghai Sainuowei Technology Development Co., Ltd., Shanghai (CN)

(72) Inventors: Jia Luo, Shanghai (CN); Liang Zhou, Shanghai (CN)

(73) Assignee: SHANGHAI SAINUOWEI TECHNOLOGY DEVELOPMENT CO., LTD., Shanghai (CN)

( * ) Notice: Subject to any disclaimer, the term of this patent is extended or adjusted under 35 U.S.C. 154(b) by 112 days.

(21) Appl. No.: 18/782,706

(22) Filed: Jul. 24, 2024

(65) Prior Publication Data

US 2024/0373796 A1      Nov. 14, 2024

(51) Int. Cl.
*A01G 9/24*          (2006.01)
*F24F 7/007*         (2006.01)

(52) U.S. Cl.
CPC ............... *A01G 9/24* (2013.01); *F24F 7/007* (2013.01)

(58) Field of Classification Search
CPC ................................... A01G 9/24; F24F 7/007

USPC ....................................... 248/176.1; 138/107
See application file for complete search history.

(56)          References Cited

U.S. PATENT DOCUMENTS

| | | | | |
|---|---|---|---|---|
| 2,091,265 | A | * 8/1937 | Brown | E21F 1/04 |
| | | | | 138/107 |
| 4,382,401 | A | * 5/1983 | Simmler | F24F 13/02 |
| | | | | 239/122 |
| 5,044,259 | A | * 9/1991 | Catan | F24F 7/065 |
| | | | | 454/305 |
| 9,644,858 | B2 | * 5/2017 | Pinkalla | F24F 13/0254 |

\* cited by examiner

*Primary Examiner* — Anita M King
(74) *Attorney, Agent, or Firm* — ArentFox Schiff LLP

(57)          ABSTRACT

Provided is a ventilator for plant cultivation, which belongs to the field of plant cultivation and includes a housing, a first hanging mounting component and a connection assembly. A fan is arranged inside the housing. The first hanging mounting component is arranged outside the housing. The connection assembly includes a clamp, the clamp is sleeved on the housing, and the first hanging mounting component is connected to the connection assembly.

10 Claims, 4 Drawing Sheets

VENTILATOR FOR PLANT CULTIVATION

TECHNICAL FIELD

This disclosure relates to plant cultivation, and in particular, a ventilator for plant cultivation.

BACKGROUND

A ventilator is usually required in a plant cultivation environment, the main purpose of which is to ensure the stability of oxygen and carbon dioxide concentrations in the air. During the day, when photosynthesis is greater than respiration, more carbon dioxide is consumed than produced. For the good growth of plants, ventilation is required to ensure enough carbon dioxide in the air for photosynthesis. Similarly, at night, only respiration is performed, which consumes oxygen and produces carbon dioxide. For plants to develop, ventilation must be ensured. In addition, ventilation is also important for regulating the temperature and humidity of the environment.

Conventional ventilators are generally not provided with hanging mounting components, which makes it very inconvenient to mount the ventilators and difficult to fix the ventilators in the cultivation environment.

SUMMARY

An object of the present disclosure is to provide a ventilator for plant cultivation, which can be conveniently hung in the cultivation environment such as a tent or a cultivation room.

To achieve this object, the following technical solutions are adopted in the present disclosure.

A ventilator for plant cultivation includes a housing with a fan arranged inside the housing; a first hanging mounting component arranged outside the housing; and a connection assembly including a clamp. The clamp is sleeved on the housing, and the first hanging mounting component is connected to the connection assembly.

In one or more embodiments, the connection assembly further includes a connection shaft, the clamp has at least one opening, two edges of the opening are each provided with a connection portion, the connection shaft is arranged to pass through the two connection portions, and the first hanging mounting component is sleeved on the connection shaft.

In one or more embodiments, the first hanging mounting component is pivotably sleeved on the connection shaft.

In one or more embodiments, the connection shaft is a bolt, one end of the bolt is provided with a locking nut, and the two connection portions are both located between a head of the bolt and the locking nut.

In one or more embodiments, the first hanging mounting component includes a first connection piece and a first mounting portion, the first connection piece is provided with a first hanging hole, the first mounting portion is connected to the first connection piece, and the first mounting portion is provided with a first mounting hole.

In one or more embodiments, multiple first mounting portions are provided and spaced apart.

In one or more embodiments, the first mounting portion is a sheet-shaped structure, and the first mounting portion is arranged to be perpendicular to the first connection piece.

In one or more embodiments, the housing includes a first end cover, a second end cover and a main body, the first end cover and the second end cover are arranged at two ends of the main body respectively, and two connection assemblies are provided. The two connection assemblies are configured to connect the first end cover to the main body and connect the second end cover to the main body, respectively.

In one or more embodiments, the clamp is provided with an annular groove, and two ends of the main body, one end of the first end cover connected to the main body and one end of the second end cover connected to the main body each are provided with a flange engaged in the annular groove.

In one or more embodiments, the ventilator for plant cultivation further includes a second hanging mounting component. The second hanging mounting component includes a second connection piece and a second mounting portion, the second connection piece is provided with a second hanging hole, and the second mounting portion is sleeved on the connection shaft.

Beneficial effects are as follows:

In the ventilator for plant cultivation according to the present disclosure, the connection assembly is provided on the housing, and the first hanging mounting component is connected to the connection assembly so that when the ventilator is mounted, the first hanging mounting component can be used to conveniently hang the ventilator in the cultivation environment. The connection assembly includes the clamp sleeved on the housing, so the connection is stable, which can effectively prevent the ventilator from falling off.

BRIEF DESCRIPTION OF DRAWINGS

In order to more clearly illustrate the technical solutions in the embodiments of the present disclosure, the drawings required for use in the description of the embodiments of the present disclosure will be briefly introduced below. Obviously, the drawings described below are only some embodiments of the present disclosure. For the person of ordinary skills in the art, other drawings can be obtained based on the contents of the embodiments of the present disclosure and these drawings without making creative efforts.

Figure 1:
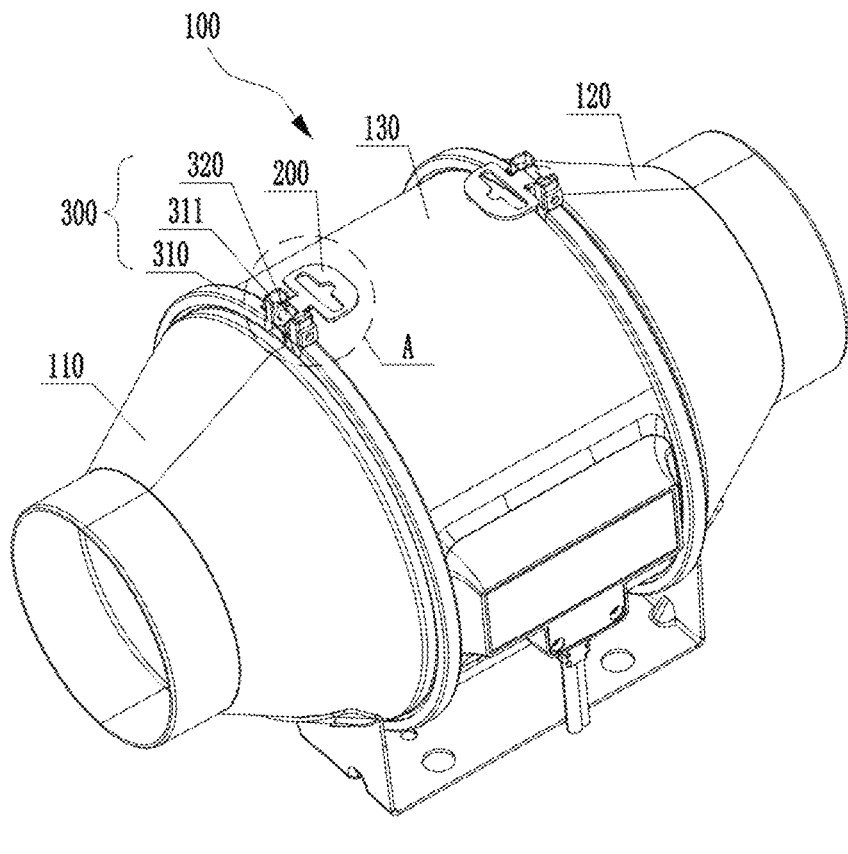
FIG. 1 is a schematic structural diagram one of a ventilator for plant cultivation according to the present disclosure.

REFERENCE LIST 100 housing
101 flange
110 first end cover
120 second end cover
130 main body
200 first hanging mounting component
210 first connection piece
220 first mounting portion
300 connection assembly
310 clamp
311 connection portion

320 connection shaft
400 second hanging mounting component
410 second connection piece
420 second mounting portion

DETAILED DESCRIPTION

The technical solution of the present disclosure will be described clearly and completely in conjunction with the drawings. Apparently, the described embodiments are part rather than all of the embodiments of the present disclosure. Based on the embodiments in the present disclosure, all other embodiments obtained by the person of ordinary skills in the art without making creative efforts are within the scope of protection of the present utility model.

In the description of the present disclosure, it should be noted that positions or positional relationships indicated by the terms "center", "up", "down", "left", "right", "vertical", "horizontal", "inside", "outside" and the like are based on the positions or positional relationships shown in the accompanying drawings, and are only for the convenience of describing the present disclosure and simplifying the description, rather than indicating or implying that the device or element referred to must have a specific position or be constructed and operated in a specific position, and therefore cannot be understood as limiting the present disclosure. Furthermore, the terms "first" and "second" are only used for descriptive purposes and cannot be understood as indicating or implying relative importance. The terms "first position" and "second position" are two different positions, and the first feature "above", "over" and "on" the second feature include the first feature being directly above and obliquely above the second feature, or simply indicate that the first feature is higher in level than the second feature. The first feature "below", "under" and "beneath" the second feature include the first feature being directly below and obliquely below the second feature, or simply indicate that the first feature is lower in level than the second feature.

In the description of the present disclosure, it should be noted that, unless otherwise clearly specified and limited, the terms "mounting", "connection" and "joint" should be understood in a broad sense, for example, it can be a fixed connection, a detachable connection, or an integral connection; it can be a mechanical connection or an electrical connection; it can be a direct connection, or it can be an indirect connection through an intermediate medium, or it can be a communication between interiors of two components. For a person of ordinary skills in the art, the specific meanings of the above terms in the present disclosure can be understood according to circumstances.

The embodiments of the present disclosure are described in detail hereinafter, and examples of the embodiments are shown in the accompanying drawings, where the same or similar reference numerals throughout represent the same or similar elements or elements with the same or similar functions. The embodiments described below with reference to the accompanying drawings are exemplary and are only intended to explain the present disclosure, and cannot be understood as limiting the present disclosure.

Figure 2:
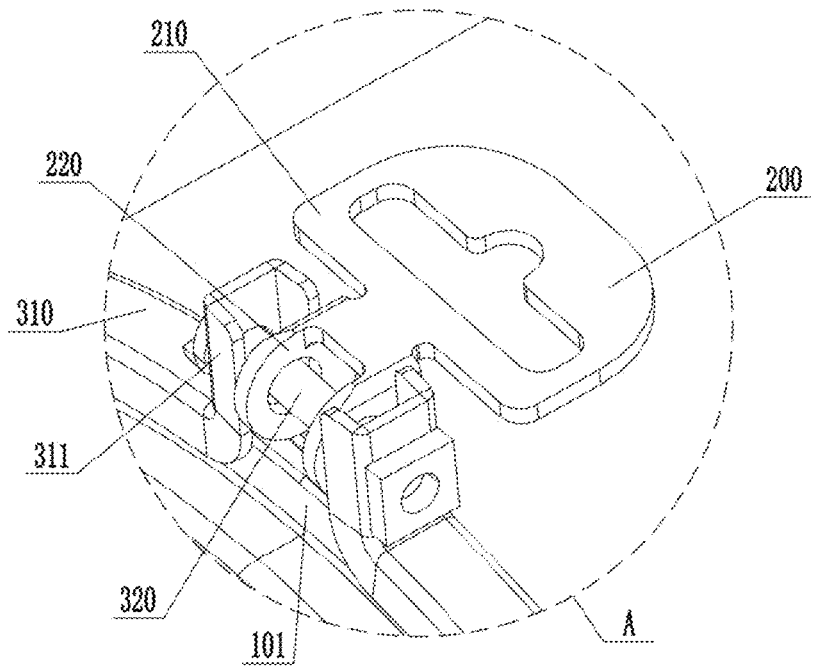
FIG. 2 is a partial enlarged view of A in FIG. 1.
Figure 3:
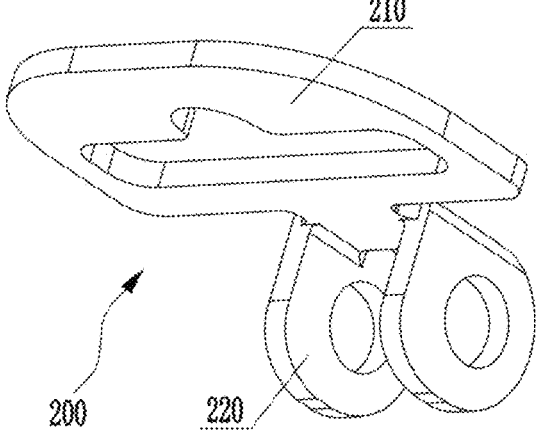
FIG. 3 is a schematic structural diagram of a first hanging mounting component according to the present disclosure.

Referring to FIG. 1 to FIG. 3, a ventilator for plant cultivation is provided according to this embodiment, and includes a housing 100, a first hanging mounting component 200 and a connection assembly 300. A fan is arranged inside the housing 100. The first hanging mounting component 200 is arranged outside the housing 100. The connection assembly 300 includes a clamp 310, the clamp 310 is sleeved on the housing 100, and the first hanging mounting component 200 is connected to the connection assembly 300.

In the ventilator for plant cultivation described above, the connection assembly 300 is arranged on the housing 100, and the first hanging mounting component 200 is connected to the connection assembly 300 so that when the ventilator is mounted, the first hanging mounting component 200 can be used to conveniently hang the ventilator in the cultivation environment. The connection assembly 300 includes the clamp 310 sleeved on the housing 100, so the connection is firm, which can effectively prevent the ventilator from falling off.

Further, still referring to FIG. 1 and FIG. 2, the housing 100 includes a first end cover 110, a second end cover 120 and a main body 130. The first end cover 110 and the second end cover 120 are arranged at two ends of the main body 130 respectively. Two connection assemblies 300 are provided, and the first end cover 110 and the main body 130 are connected and the second end cover 120 and the main body 130 are connected through the two connection assemblies 300, respectively. In this embodiment, the connection assemblies 300 can connect the two end covers to the main body 130 on one hand, and the connection assemblies 300 can connect the first hanging mounting component 200 to the housing 100 on the other hand. The two connection assemblies 300 are provided and each connection assembly 300 is provided with the first hanging mounting component 200, thereby ensuring the stability and balance of connection of the ventilator, and effectively reducing the shaking of the ventilator during operation.

Further, the clamp 310 is provided with an annular groove, and two ends of the main body 130, an end of the first end cover 110 connected to the main body 130, and an end of the second end cover 120 connected to the main body 130 each are provided with a flange 101 engaged in the annular groove. When the first end cover 110 and the main body 130 are assembled, the flange 101 of the first end cover 110 and the flange 101 at one end of the main body 130 are jointed, then the clamp 310 is sleeved on the two flanges 101 to engage the two flanges 101 in the annular groove, and the assembly is very convenient and reliable. The assembly of the second end cover 120 and the main body 130 is the same as that of the first end cover 110, which is not repeated here.

Further, the connection assembly 300 includes a connection shaft 320, the clamp 310 is provided with at least one opening, and two edges of the opening are each provided with a connection portion 311, the connection shaft 320 passes through the two connection portions 311, and the first hanging mounting component 200 is sleeved on the connection shaft 320. The connection shaft 320 passes through the connection portions 311 of the clamp 310 so that the clamp 310 can be connected to the housing 100. Moreover, the connection shaft 320 is arranged such that it can be used to mount the first hanging mounting component 200.

In one or more embodiments, the first hanging mounting component 200 may be pivotably sleeved on the connection shaft 320. The first hanging mounting component 200 is capable of rotating relative to the connection shaft 320. When the first hanging mounting component 200 is not used, the first hanging mounting component 200 can be rotated to a horizontal position to facilitate storage and not occupy space.

Further, the connection shaft 320 may be a bolt, one end of the bolt is provided with a locking nut, and both the two connection portions 311 are located between a head of the bolt and the locking nut. It can be understood that the two connection portions 311 should be located between the head of the bolt and the locking nut so that the clamp 310 can be locked on the housing 100 by tightening the nut, which is convenient for connection and effectively prevents the ventilator from being separated from the clamp 310.

Further, referring to FIG. 2 and FIG. 3, the first hanging mounting component 200 includes a first connection piece 210 and a first mounting portion 220, the first connection piece 210 is provided with a first hanging hole, the first mounting portion 220 is connected to the first connection piece 210, and the first mounting portion 220 is provided with a first mounting hole for the first hanging mounting component 200 to be pivotably connected to the connection shaft 320. The shape of the first hanging hole is set according to the use requirements. For example, when setting up a tent, the ventilator may be hung on a tent pole through the first hanging hole.

Further, multiple first mounting portions 220 are provided and arranged at intervals. In this embodiment, two first mounting portions 220 are provided, and the two first mounting portions 220 are symmetrically arranged. In other embodiments, the number of first mounting portions 220 may also be three, four or other numbers, which can be set according to the use requirements. It can be understood that multiple first mounting portions 220 are disposed so that the structural strength of the first hanging mounting component 200 can be increased, thus, effectively preventing breaking of the first mounting portions 220 and the first connection piece 210 which may cause the ventilator to fall.

Further, the first mounting portion 220 is a sheet-shaped structure, and the first mounting portion 220 and the first connection piece 210 are arranged to be perpendicular to each other, that is, multiple first mounting portions 220 are arranged in parallel, and the first connection piece 210 can rotate to a position parallel to the central axis of the housing 100.

Figure 4:
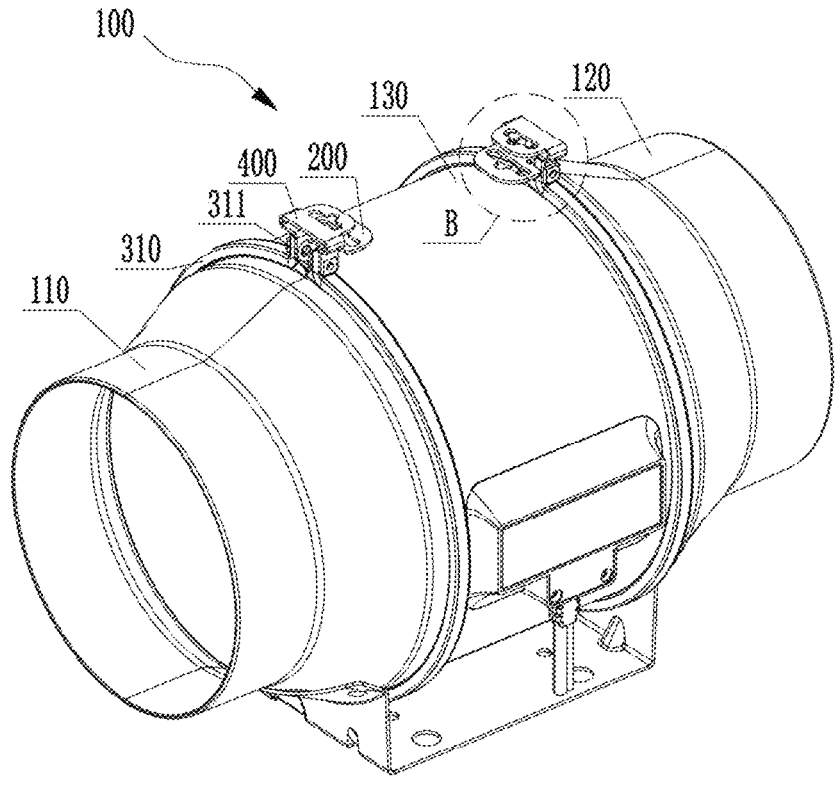
FIG. 4 is a schematic structural diagram two of a ventilator for plant cultivation according to the present disclosure.
Figure 5:
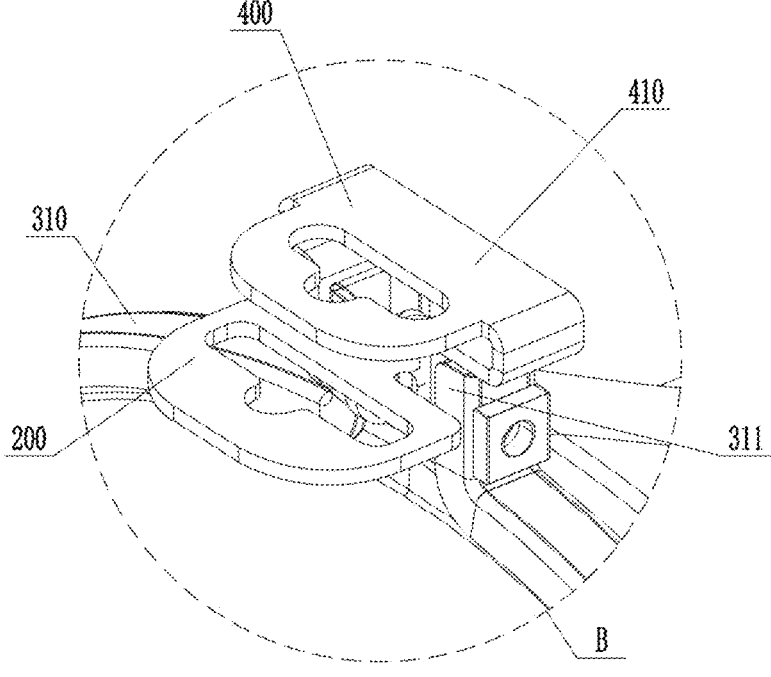
FIG. 5 is a partial enlarged view of B in FIG. 4.
Figure 6:
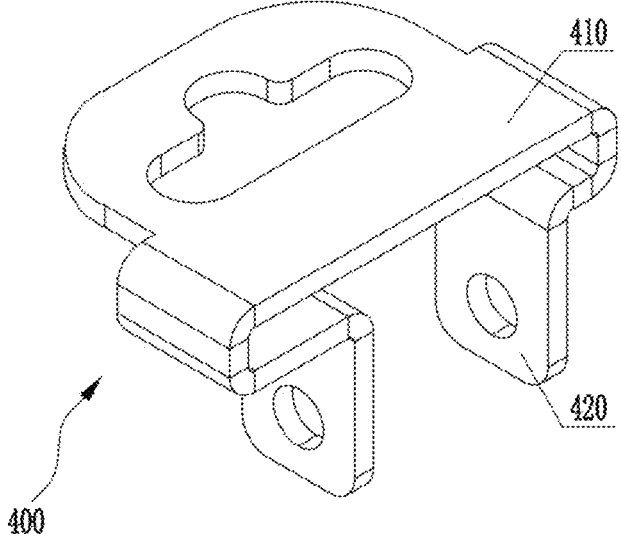
FIG. 6 is a schematic structural diagram of a second hanging mounting component according to the present disclosure.

Further, referring to FIG. 4 to FIG. 6, the ventilator for plant cultivation according to this embodiment also includes a second hanging mounting component 400, and the second hanging mounting component 400 includes a second connection piece 410 and a second mounting portion 420, the second connection piece 410 is provided with a second hanging hole, and the second mounting portion 420 is connected to the connection shaft 320. Exemplarily, two second mounting portions 420 are provided, and the two second mounting portions 420 are sheet-shaped structures. The two second mounting portions 420 are arranged to be spaced apart and in parallel, and the second mounting portions 420 are perpendicular to the second connection piece 410. In one or more embodiments, the spacing between the two second mounting portions 420 is greater than the spacing between the two first mounting portions 220 so that when being assembled, the two first mounting portions 220 are located between the two second mounting portions 420. Each of the second mounting portions 420 is provided with a second mounting hole, and the second mounting hole is used for pivotable connection with the connection shaft 320.

For a small-size ventilator, the ventilator can be hung in the cultivation environment simply by the first hanging mounting component 200, while for a large-size ventilator, the second hanging mounting component 400 can be additionally arranged so that the ventilator can be hung in the cultivation environment through four hanging holes. Apparently, in other embodiments, the number of first hanging mounting components 200 and the number of second hanging mounting components 400 are set according to the use requirements, as long as the stable mounting of the ventilator can be ensured, and no specific limitation is made here.

Apparently, the above embodiments of the present disclosure are merely examples for the purpose of clearly illustrating the present disclosure, and are not intended to limit the embodiments of the present disclosure. For a person skilled in the art, various obvious changes, readjustments and substitutions can be made without departing from the scope of protection of the present disclosure. It is not necessary and impossible to list all embodiments here. Any modification, equivalent substitution and improvement made within the spirit and principle of the present disclosure shall be included in the scope of protection of the claims of the present disclosure.

What is claimed is:

1. A ventilator for plant cultivation, comprising:
a housing, wherein a fan is arranged inside the housing;
a first hanging mounting component arranged outside the housing; and
a connection assembly comprising a clamp, wherein the clamp is sleeved on the housing, and the first hanging mounting component is connected to the connection assembly;
wherein the connection assembly further comprises a connection shaft, the clamp has at least one opening, two connection portions are arranged at two edges of an opening of the at least one opening respectively, the connection shaft is arranged to pass through the two connection portions, and the first hanging mounting component is sleeved on the connection shaft.

2. The ventilator for plant cultivation according to claim 1, wherein the first hanging mounting component is pivotably sleeved on the connection shaft.

3. The ventilator for plant cultivation according to claim 1, wherein the connection shaft is a bolt, one end of the bolt is provided with a locking nut, and the two connection portions are both located between a head of the bolt and the locking nut.

4. The ventilator for plant cultivation according to claim 1, wherein the first hanging mounting component comprises a first connection piece and a first mounting portion, the first connection piece is provided with a first hanging hole, the first mounting portion is connected to the first connection piece, and the first mounting portion is provided with a first mounting hole.

5. The ventilator for plant cultivation according to claim 4, wherein a plurality of first mounting portions are provided, and the plurality of first mounting portions are spaced apart.

6. The ventilator for plant cultivation according to claim 4, wherein the first mounting portion is a sheet-shaped structure, and the first mounting portion is arranged to be perpendicular to the first connection piece.

7. The ventilator for plant cultivation according to claim 1, wherein the housing comprises a first end cover, a second end cover and a main body, the first end cover and the second end cover are arranged at two ends of the main body respectively, two connection assemblies are provided and are configured to connect the first end cover to the main body and connect the second end cover to the main body respectively.

8. The ventilator for plant cultivation according to claim 7, wherein the clamp is provided with an annular groove, and two ends of the main body, one end of the first end cover connected to the main body and one end of the second end cover connected to the main body are each provided with a flange engaged in the annular groove.

9. The ventilator for plant cultivation according to claim 1, further comprising a second hanging mounting component, wherein the second hanging mounting component comprises a second connection piece and a second mounting portion, the second connection piece is provided with a second hanging hole, and the second mounting portion is sleeved on the connection shaft.

10. A ventilator for plant cultivation, comprising:

a housing, wherein a fan is arranged inside the housing;

a first hanging mounting component arranged outside the housing; and a connection assembly comprising a clamp, wherein the clamp is sleeved on the housing, and the first hanging mounting component is connected to the connection assembly;

wherein the housing comprises a first end cover, a second end cover and a main body, the first end cover and the second end cover are arranged at two ends of the main body respectively, two connection assemblies are provided and are configured to connect the first end cover to the main body and connect the second end cover to the main body respectively.

\* \* \* \* \*